Sept. 22, 1970
C. PENNY
3,529,731
PIPE HANDLING APPARATUS
Filed Sept. 27, 1968
3 Sheets-Sheet 1
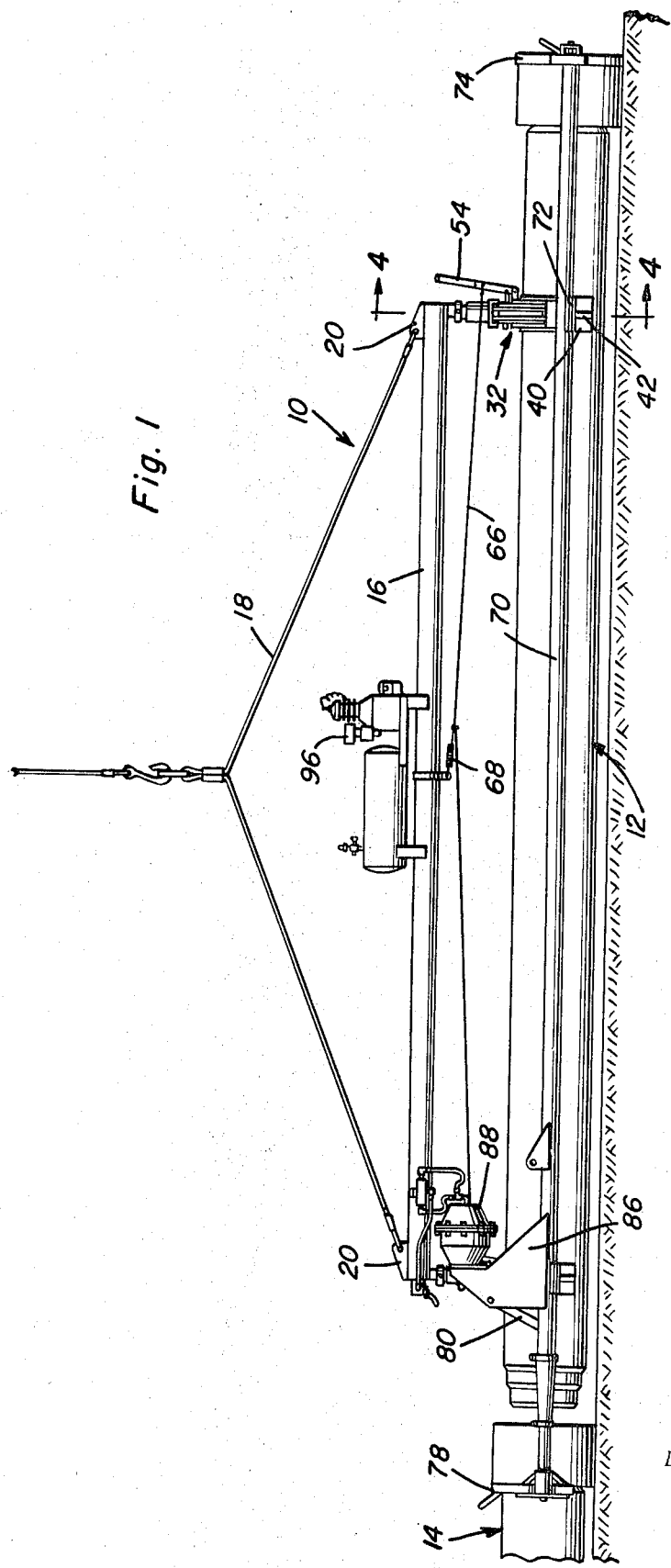
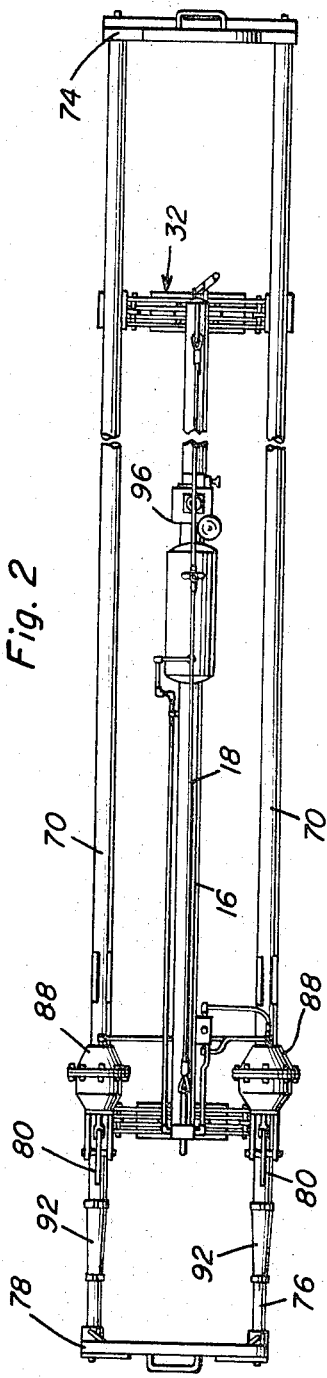
Charles Penny
INVENTOR.
BY *Clarence A. O'Brien
and Harvey B. Jacobson*
Attorneys

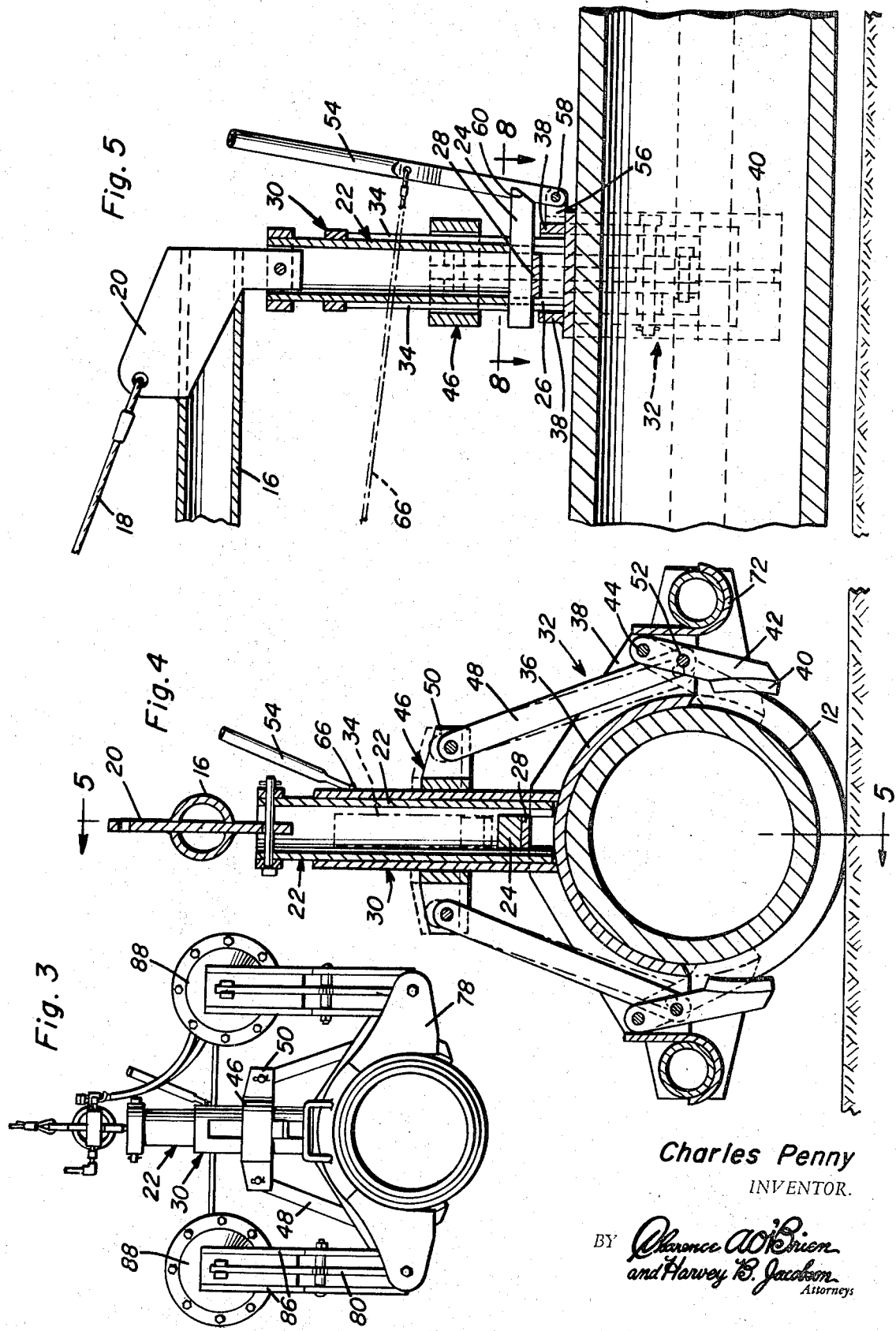

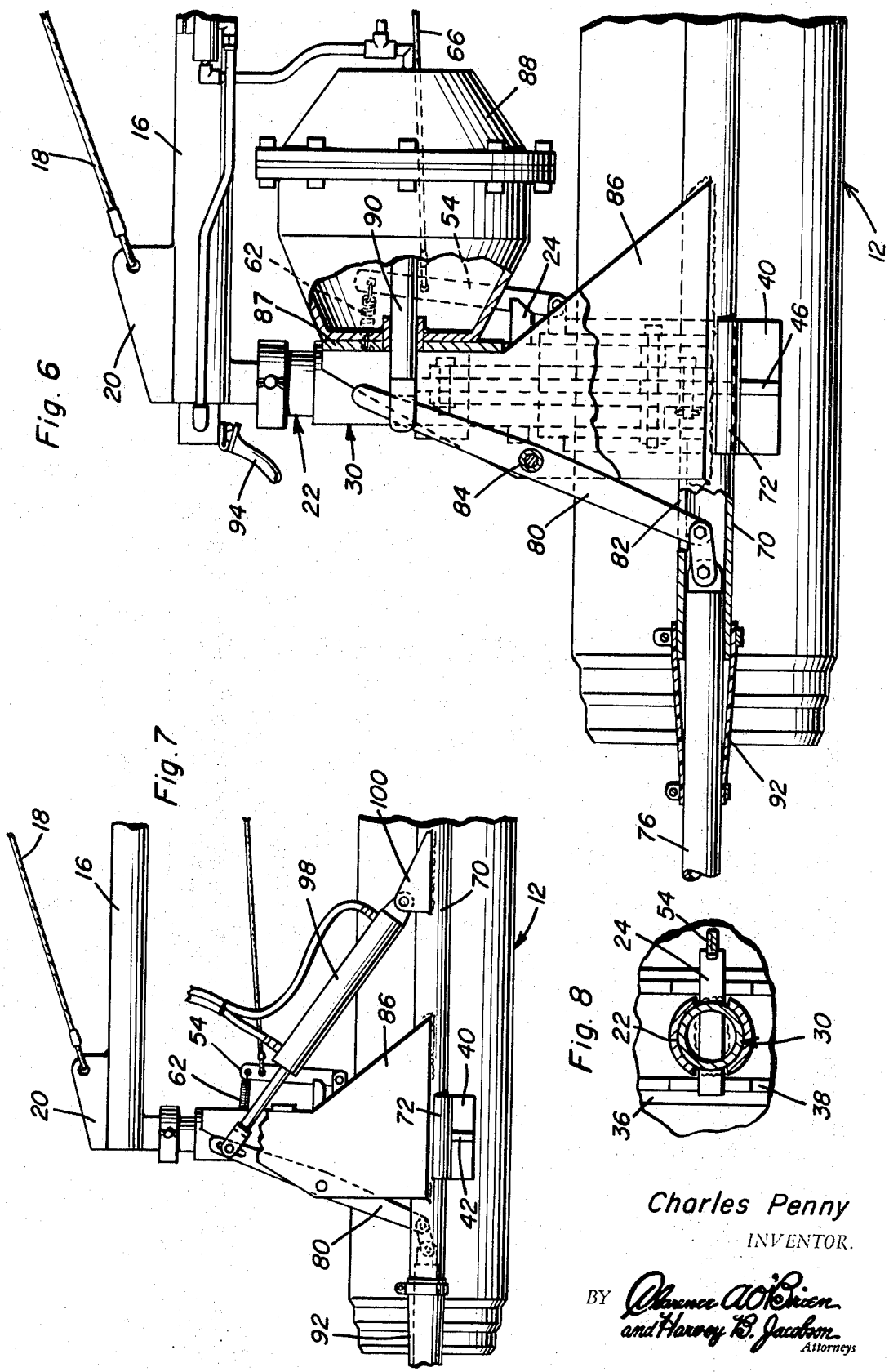

United States Patent Office 3,529,731
Patented Sept. 22, 1970

3,529,731
PIPE HANDLING APPARATUS
Charles Penny, 108 Indian Hill Drive,
Belleville, Ill. 62223
Filed Sept. 27, 1968, Ser. No. 763,085
Int. Cl. B23p 19/04
U.S. Cl. 214—1                      11 Claims

ABSTRACT OF THE DISCLOSURE

Apparatus for positioning pipe including a spreader bar mounting a pair of longitudinally spaced pipe cradles operative to selectively grasp the pipe upon the release of latch means and an upward movement of the spreader bar, and automatically release the pipe upon an engagement of the pipe on a supporting surface such as a trench bottom or the like. The apparatus also includes a pair of power actuated arms which mount a pulling shoe engageable with the bell end of a previously installed pipe for a drawing of the support pipe thereto.

---

The instant invention is generally concerned with pipe handling apparatus, and more particularly relates to apparatus whereby a section of pipe can be raised, moved into position, and drawn tightly against a previously installed pipe section.

A significant object of the instant invention resides in the provision of apparatus which is for the most part power operated and automatic in operation, requiring only a minimum amount of manual labor and supervision.

Also of significance is the fact that the apparatus of the instant invention is of a relatively simple although highly unique construction capable of effectively performing the operations expected thereof in a trouble-free manner, thereby constituting a significant improvement over the means and methods conventionally utilized in the positioning of pipe.

Basically, the apparatus of the instant invention includes a pair of longitudinally spaced pipe cradles or cradling units mounted on a cable suspended spreader bar. The cradles are, upon the release of latch means, automatically engageable with the pipe for a raising and positioning thereof, and are subsequently automatically disengageable from the pipe upon a positioning of the pipe in the desired location. The apparatus also includes means specifically utilized for longitudinally drawing the cradle held pipe into close coupled engagement with a previously installed pipe or length of pipe.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a longitudinal view of the apparatus in operative engagement with a pipe;

FIG. 2 is a top plan view of the apparatus;

FIG. 3 is an end view of the apparatus taken from the coupling end thereof;

FIG. 4 is an enlarged cross-sectional view taken substantially on a plane passing along line 4—4 in FIG. 1 and illustrating both the open and closed positions of one of the cradles;

FIG. 5 is a cross-sectional view taken substantially on a plane passing along line 5—5 in FIG. 4;

FIG. 6 is an enlarged end elevational view, with portions broken away for purposes of illustration, of the left hand or coupling end of the apparatus;

FIG. 7 is a reduced elevational view similar to FIG. 6 illustrating a modified form of power unit for the actual coupling means; and FIG. 8 is a cross-sectional view taken substantially on a plane passing along line 8—8 in FIG. 5.

Referring now more specifically to the drawings, reference numeral 10 is used to designate the pipe handling apparatus comprising the instant invention, reference numeral 12 indicating a pipe or length of pipe being positioned by the apparatus 10, and reference numeral 14 designating a previously installed pipe or length of pipe.

The pipe handling apparatus 10 includes, as a main support, an elongated rigid spreader bar 16, which may be in the nature of a tubular member. This spreader bar 16 is to be supported and controlled from an overhead support, for example the boom of any appropriate power machine, and as such, is provided with a suspension cable 18 engaged with the opposite ends of the spreader bar 16 through a pair of upstanding ears or lugs 20.

Fixed to and depending vertically from the opposed end portions of the spreader bar 16 are a pair of rigid tubular members 22, each mounting a transversely extending radially outward projecting lock bar 24. Each lock bar is received through a pair of diametrically opposed slots 26 in the corresponding tube 22 and is both rigidly welded to the member 22 and supported by an underlying disk 28 also welded to the member 22.

Each tubular member 22 is telescopically received within an upwardly opening second or outer tubular member 30 which is in turn rigidly welded to one of the cradle units 32. The outer tubular member 30 is provided with a pair of opposed vertically elongated slots 34 which receive the outwardly projecting ends of the lock bar 24 whereby a sliding of the lock bar 24, in conjunction with a telescoping movement of the inner member 22, can be effected.

The lower end of the outer member 34 is rigidly welded to an arcuate plate 36 which is formed so as to conform to the configuration of a pipe 12 to be positioned. A pair of laterally spaced vertically orientated plates 38 are positioned to the opposite sides of the outer rigid tubular member 30 and are welded to the outer surface of the arcuate plate 36, generally following the contour thereof from one end to the other.

A horizontally elongated cradle shoe 40 is positioned laterally to each side of the pipe 12 and pivotally suspended by a vertical arm 42 pinned to the end portions of the opposed vertically orientated plates 38 by pivot pin means 44 whereby a swinging of the shoes between a first vertical pipe disengaging position and a second pipe engaging position is possible. Upon an engagement with the pipe, the opposed pair of shoes 40 associated with each cradle unit 32 actually contact the pipe below the horizontal centerline thereof so as to act in the nature of a cradle or support for the pipe.

The swinging movement of the cradle shoes 40 is effected through the vertical movement of a collar 46 which is slidably received about the outer member 30. This collar is engaged with the opposed shoe mounting arms 42 by two pairs of elongated rigid links 48, each pair being both pivotally engaged with an outwardly extending ear 50 on the collar 46, and the corresponding cradle shoe arm 42 at a point 52 spaced below the pivot pin 44 associated with the arm 42. The ears 50 on the collar 46 which mount the pivotally secured links 48 are of course diametrically opposed from each other with the relationship between the collar 46 and the two cradle shoes 40 associated therewith being such whereby a simultaneous inward or outward movement of the cradle shoes 40 is effected in response to an upward or downward sliding of the collar 46 on the outer tubular member 30.

Finally, noting FIG. 5 in particular, each cradle unit 32 is provided with a generally vertically orientated elongated notched lever or latch 54 which is pivotally mounted between a pair of laterally projecting mounting ears 56 on the arcuate plate 36 which seats on the pipe 12 by means of an appropriate pivot pin 58. The lever or latch 54 projects vertically and includes at least a portion thereof in vertical alignment with one projecting end of the lock bar 24, the lever 54 having a notch 60 therein which receives the lock bar end and prevents an upward movement of the lock bar, and hence also prevents an upward movement of the inner tube 22. The lever 54 is to be spring-loaded toward engagement with the lock bar end whereby a positive manual movement of the lever 54 will be required to release the lock bar 24. This locking of the lock bar, incidently, is in the lowermost position thereof whereby a free sliding movement of the collar 46 to its lower or shoe releasing position is effected. Upon a release of the two levers 54, and an upward drawing on the spread bar 16, the lock bar carrying inner tubes or members 22 will move upwardly, the lock bars 24 engaging the collars 46 and causing an upward movement thereof which in turn results in an inward swinging of the cradle shoes 40 into supporting engagement with the pipe 12. By the same token, upon a downward movement of the spreader bar 16 to and beyond the point at which the pipe 12 is supported on the ground, the inner tubes or members 22, and hence the lock bars 24 thereon, will move downwardly within the outer members 30 and the latch bar ends will automatically engage within the notches 60 on the two spring-loaded levers 54. In order to facilitate this automatic relatching of the lock bars 24, the lever engaging ends thereof can have a beveled or camming surface much in the manner of a conventional lock bar.

With reference to the left hand end of the pipe handling apparatus as detailed in FIG. 6, it will be noted that the latch or lever 54 associated with this end is spring-biased into engagement with the corresponding lock bar 24 by means of a coiled tension spring 62 engaged directly between the latch bar 54 and, as an example, the adjoining outer member 30 at a point above the uppermost limit of movement of the corresponding collar 46. In addition, an elongated trip cable 66 extends between the right and left end levers 54 with this cable being supported at an intermediate point along the length thereof by a second coiled tension spring 68 which acts to exert a leftward bias on the cable 66 so as to maintain an inward biasing of the right hand lever 54 for engagement with its lock bar 24. The simultaneous release of the two lock bars 24 can thus be easily effected by a grasping and outward swinging of the right hand lever 54 which, through the trip cable 66, will also effect a release of the left hand lever 54 and lock bar 24. In fact, such a release of the two levers 54 can actually be effected through a pull on any portion of the trip cable 66 so as to produce a rearward drawing of the left hand lever 54 with the right hand lever 54 falling outward through its own overbalanced weight. As noted previously, once the levers 54 are disengaged from the lock bars 24, the inner members 22, carrying the lock bars 24, are free to move upward, contacting the collars 46 and effecting an upward movement thereof which results in a corresponding inward swinging of the pipe cradling and supporting shoes 40 for a lifting of the pipe 12.

The complete handling of a length of pipe 12 involves a coupling of this pipe to a previously installed pipe 14. Thus, the apparatus 10 also includes a pair of elongated laterally spaced horizontal tubular beams 70, each seated and welded or otherwise fixed within a pair of rigid seats 72 welded to the outer vertical edges of the vertical cradle plates 38, thereby orientating the beams 70 at about mid-height of a cradle supported pipe 12. These beams 70 project beyond both cradle units 32 with the right hand end of the two beams having a rigid transverse end plate 74 fixed thereto and extending therebetween. This end plate 74 is adapted for engagement with the bell end of a pipe 12 to be raised, thus properly orientating the apparatus 10 on the pipe. The left hand ends of the two beams 70 telescopically receive a pair of tubular pulling or coupling arms 76. A saddle or yoke shaped pulling shoe 78 releasably bolts to the extreme ends of the pulling or coupling arms 76, this yoke 78, upon a bringing of the carried pipe 12 adjacent the bell end of the installed pipe 14, seating behind the bell of the pipe 14, either by seating directly thereon through a manipulation of the apparatus 10 and the supported pipe 12, or being mounted on the pulling arms 76 subsequent to a positioning of the pipe 12 in general alignment with the pipe 14. Once the yoke 78 is engaged with the bell end of the pipe 14, the pulling or coupling arms 76 are retracted within the tubular beams 70, thereby drawing the suspended pipe 12 into coupled engagement with the previously installed pipe 14.

With regard to this retraction of the coupling or pulling arms 76, attention is particularly directed to FIGS. 3 and 6. The rear end of each of the arms 76 is pivotally engaged with the lower end of a rigid link 80 which extends through an elongated slot 82 defined through the tubular arm receiving beam 70 and which is in turn pivotally mounted at a central point along the length thereof, as indicated at 84, between a pair of upright mounting plates 86 welded to the opposed sides of and projecting vertically from the corresponding beam 70. These vertical mounting plates 86 are rigidly interlocked, at the upper portions thereof, by a transversely extending plate 87. Each plate 87 in turn mounts a pneumatic diaphragm-type ram 88, the actuator or rod 90 thereof being in engagement with the upper portion of the lever or link 80 whereby, upon an extension of the ram rod 90, the corresponding swinging of the link 80 will result in a retraction of the pulling arm 76 and a drawing of the pipe 12 to the pipe 14. In order to maintain the telescoping joint between each arm 76 and the corresponding beam 70 free of dust or the like, a suitable resilient boot 92 can be provided, clamped to both the arm 76 and the adjoining end of the beam 70. Appropriate controls 94 can be provided for the two rams 88 at any convenient location, such as at the adjoining end of the spreader bar 16. In addition, noting FIGS. 1 and 2, the necessary power plant 96 can be mounted centrally on the spreader bar 16. Once the pipes 12 and 14 have been coupled, the arms 76 can be extended so as to free the pulling shoe or yoke 78, and the pipe 12 released for a removal of the entire apparatus 10. Incidentally, it will be noted that both the end plate 74 and the pulling shoe 78 are provided with handles whereby a manual manipulation of the apparatus for a positive alignment of the pipes can be easily effected.

With reference to FIG. 7, as an alternative to the use of a pair of pneumatic diaphragm-type rams 88, a pair of hydraulic rams 98 can be mounted between the upper ends of the pivotally mounted links or levers 80 and two pairs of mounting ears 100 fixed to the opposed beams 70 immediately rearward of the mounting plates 86. These hydraulic rams 98 will of course operate the pulling arms 76 in the same manner as the pneumatic rams 88.

In use, the inner tubular members 22 are locked in their lowermost position within the outer tubes 30 by an engagement of the two levers 54 with the associated lock bars 24. In this position, the cradle shoes 40 will swing downwardly and outwardly both under their own weight and under the influence of the downwardly shifting collar 46. Upon a positioning of the apparatus over a pipe 12 with the arcuate plate 36 of the two cradle units 32 sitting thereon, the levers 54 are released and the apparatus is now set to raise and transport the pipe 12. This is effected by a raising of the support or spreader bar 16 which in turn draws the inner tubular members 22 upward, moving the lock bars 24 up into engagement with the collars 46. Upon engaging the collars 46, the collars are raised along with the upwardly moving lock bars 24. This in turn results in an inward pivoting of the cradle shoes 40 into supporting engagement with the pipe 12 whereby upon a continued raising of the spreader bar 16, the pipe 12 is elevated. Incidentally, a proper positioning of the apparatus 10 on the pipe 12 is facilitated by the end plate 74 which engages against the bell end of the pipe 12. The elevated pipe 12 is then positioned, normally within a trench, adjacent and in alignment with the bell end of a previously installed pipe 14. The yoke or pulling shoe 78 is engaged behind the bell of the pipe 14, and the rams, either the pneumatic rams 88 or the hydraulic rams 98, are actuated so as to retract the pulling arms 76 and move the still suspended pipe 12 into coupled engagement with the previously installed pipe 14. Once a coupling of the pipe ends is completed, the lifting force on the suspended pipe 12 is released through a transfer of the load of the pipe completely to the supporting ground. The apparatus is then released from the pipe 12 by a continued lowering of the spreader bar 16 whereby a downward or inward telescoping of the inner tubular members 22 within the outer tubular members 30 results in an engagement of the projecting ends of the lock bars 24 with the notched levers so as to relock these tubes in what might be considered an open position of the apparatus. At the same time, upon a release of the lifting force of the lock bars 24 on the collars 46, the collars 46 move downwardly and the cradle shoes 40 swing outwardly, thereby completely releasing the pipe and allowing for a vertical removal of the apparatus 10. It will also of course be appreciated that the pulling arms 76 will be extended so as to allow for a removal of the pulling shoe 78 either prior to or in conjunction with removal of the remainder of the apparatus 10. Once the apparatus is raised from the just positioned pipe, the apparatus is again set up for engagement with the next pipe section to be positioned. Incidentally, in conclusion it should be appreciated that the cradle shoes 40, engaging below the center of the pipe 12, actually act so as to provide a supporting cradle for the pipe, rather than relying merely upon a clamping engagement of the pipe between opposed members, thus not only providing for a positive support for the pipe, avoiding any problem of slippage or the like, but also providing for a handling of the pipe in a careful nondamaging manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Pipe handling apparatus comprising an elongated support, a pair of cradle units orientated at longitudinally spaced points along said support, mounting means suspending each cradle unit from said support, said cradle units each including opposed cradle shoes mounted for movement between a first pipe clearing position and a second pipe cradling position, each cradle unit and the associated mounting means including cooperating elements for effecting a movement of the cradle shoes in response to a vertical movement of the cradle unit suspending support, the mounting means associated with each cradle unit including a first rigid member fixed to and depending from said support, and a second tubular member fixed to and projecting vertically upward from the cradle unit into surrounding telescopic reception about the first rigid member, and lock means for releasably locking the first and second members in the inwardly telescoped position thereof, each cradle unit including an arcuate plate positionable over the upper portion of a pipe to be handled, said cradle shoes being pivotally mounted laterally outward of each end portion of the associated arcuate plate for lateral swinging movement relative to the arcuate plate, forming a generally arcuate continuation of the plate in the second pipe cradling position of the cradle shoes, said lock means including a laterally projecting elongated lock bar fixed to the first rigid member depending from the support, and a notched lever mounted on the cradle unit and releasably receiving the lock bar and precluding upward movement of the first member relative to the second member when in locked engagement with the lock bar.

2. The apparatus of claim 1 wherein the cooperating elements for effecting a movement of the cradle shoes includes a collar slidably surrounding the second tubular member above said lock bar, and a pair of elongated links pivotally engaged with said collar and the opposed corresponding cradle shoes whereby an upward movement of the collar effects an inward swinging of the shoes to their second cradling position, and a downward sliding of the collar produces a movement of the cradle shoes to their first pipe clearing position, said lock bar being of a length so as to engage and vertically move said collar upwardly upon a release of the lock bar and an upward movement of the first member through an upward movement of the elongated support, thereby effecting a movement of the cradle shoes to the second pipe cradling position.

3. The apparatus of claim 2 including positioning means supported below said elongated support for laterally moving said apparatus to couple a supported pipe with a previously installed pipe.

4. The apparatus of claim 3 wherein said positioning means includes a pair of elongated laterally spaced beams positioned to the opposite sides of and supported by said cradle units, said beams projecting longitudinally beyond both cradle units, a pair of pulling arms slidably mounted on and extending longitudinally from one projecting end of the beams, a pulling shoe mounted on the outer ends of said arms for engagement with a previously installed pipe whereby a retraction of said arms relative to said beams will effect a forward movement of the apparatus suspended pipe, and means for selectively extending and retracting said arms.

5. The apparatus of claim 4 wherein at least the forward portions of said beams are hollow, said pulling arms being telescopically received therein, said means for selectively extending and retracting each arm comprising a generally elongated link pivotally engaged with the inner end of the arm, an elongated opening through the overlying portion of the beam through which the link passes, means pivotally mounting each link at a central point along the length thereof, and a power ram engaged with the upper end of each link for effecting a pivotal swinging thereof and a corresponding pivotal swinging of the lower arm connected end of the link.

6. The apparatus of claim 4 including means resiliently biasing the notched lever on each cradle unit into engagement with the corresponding lock bar, and means for effecting a synchronized release of the notched levers from the lock bars.

7. Pipe handling apparatus comprising an elongated support, a pair of cradle unit orientated at longitudinally spaced points along said support, mounting means suspending each cradle unit from said support, said cradle units each including opposed cradle shoes mounted for movement between a first pipe clearing position and a second pipe cradling position, each cradle unit and the associated mounting means including cooperating elements for effecting a movement of the cradle shoes in response to a vertical movement of the cradle unit suspending support, positioning means supported below said elongated support for laterally moving said apparatus to couple a supported pipe with a previously installed pipe, said positioning means including a pair of elongated laterally spaced beams positioned to the opposite sides of and supported by said cradle units, said beams projecting longitudinally beyond both cradle units, a pair of pulling arms slidably mounted on and extending longitudinally from one projecting end of the beams, a pulling shoe mounted on the outer ends of said arms for engagement with a previously installed pipe whereby a retraction of said arms relative to said beams will effect a forward movement of the apparatus suspended pipe, and means for selectively extending and retracting said arms, at least the forward portions of said beams being hollow, said pulling arms being telescopically received therein, said means for selectively extending and retracting each arm comprising a generally elongated link pivotally engaged with the inner end of the arm, an elongated opening through the overlying portion of the beam through which th link passes, means pivotally mounting each link at a central point along the length thereof, and a power ram engaged with the upper end of each link for effecting a pivotal swinging thereof and a corresponding pivotal swinging of the lower arm connected end of the link.

8. Pipe handling apparatus comprising an elongated support, a pair of cradle units orientated at longitudinally spaced points along said support, mounting means suspending each cradle unit from said support, said cradle units each including opposed cradle shoes mounted for movement between a first pipe clearing position and a second pipe cradling position, each cradle unit and the associated mounting means including cooperating elements for effecting a movement of the cradle shoes in response to a vertical movement of the cradle unit suspending support, the mounting means associated with each cradle unit including a first rigid member fixed to and depending from said support, and a second rigid member fixed to and projecting upward from the cradle unit juxtaposed said first rigid member, and lock means for releasably locking the first and second members against movement relative to each other, said lock means including a laterally projecting elongated lock bar fixed to the first rigid member depending from the support, and a notched lever mounted on the cradle unit and releasably receiving the lock bar and precluded upward movement of the first member relative to the second member when in locked engagement with the lock bar.

9. The apparatus of claim 8 wherein said second rigid member comprises an elongated tubular member projecting into surrounding telescopic reception about the first rigid member, said lock means locking the first and second members in the inwardly telescoped position thereof.

10. The apparatus of claim 8 wherein the cooperating elements for effecting a movement of the cradle shoes includes a collar slidably surrounding the second rigid member above said lock bar, and a pair of elongated links pivotally engaged with said collar and the opposed corresponding cradle shoes whereby an upward movement of the collar effects an inward swinging of the shoes to a cradling position, and a downward sliding of the collar produces a movement of the cradle shoes to a pipe clearing position, said lock bar being of a length so as to engage and vertically move said collar upwardly upon release of the lock bar and an upward movement of the first member through an upward movement of the elongated support, thereby effecting a movement of the cradle shoes to the pipe cradling position.

11. Pipe handling apparatus comprising an elongated support, a pair of cradle units orientated at longitudinally spaced points along said support, mounting means suspending each cradle unit from said support, said cradle units each including opposed cradle shoes mounted for movement between a first pipe clearing position and a second pipe cradling position, each cradle unit and the associated mounting means including cooperating elements for effecting a movement of the cradle shoes, positioning means supported below said elongated support for laterally moving said apparatus to couple a supported pipe with a previously installed pipe, said positioning means including a pair of elongated laterally spaced beams positioned to the opposite sides of and supported by said cradle units, a pair of pulling arms slidably mounted on and extending longitudinally from one projecting end of the beams, a pulling shoe mounted on the outer ends of said arms for engagement with a previously installed pipe whereby a retraction of said arms relative to said beams will effect a forward movement of the apparatus suspended pipe, and means for selectively extending and retracting said arms, said means for selectively extending and retracting each arm comprising a generally elongated link pivotally engaged with the inner end of the arm and extending upwardly therefrom, means pivotally mounting each link at a central point along the length thereof, and power rams means engaged with the upper ends of the links for effecting a pivot swinging thereof and a corresponding pivotal swinging of the lower arm connected ends of the links.

References Cited

UNITED STATES PATENTS

| | | | |
|---|---|---|---|
| 2,629,627 | 2/1953 | Stone | 294—110 |
| 3,036,372 | 5/1962 | Vigneron. | |
| 3,207,326 | 9/1965 | Enix. | |

ROBERT G. SHERIDAN, Primary Examiner

F. E. WERNER, Assistant Examiner

U.S. Cl. X.R.

294—81, 110